G. E. BROCK.
VEHICLE WHEEL.
APPLICATION FILED NOV. 7, 1910.
1,002,636.
Patented Sept. 5, 1911.
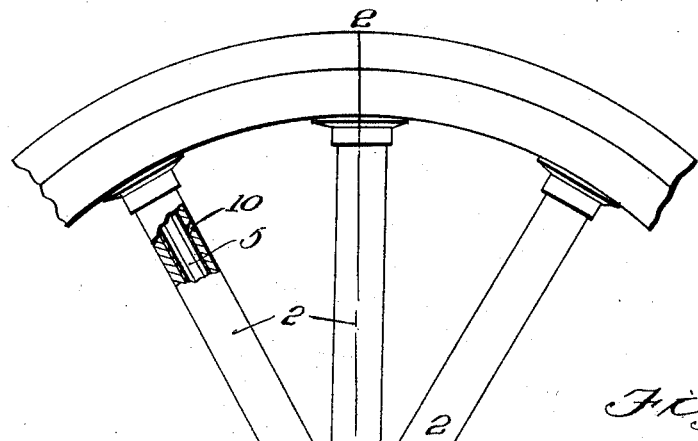
Fig. 1.
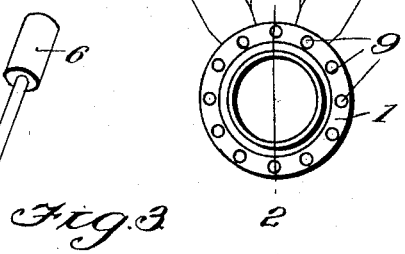
Fig. 3.
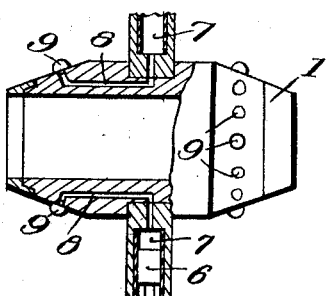
Fig. 2.
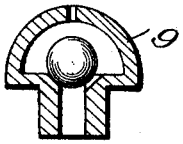
Fig. 4.
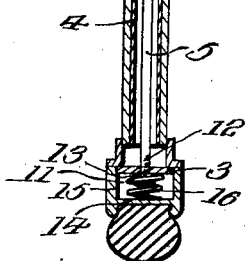
Witnesses
Inventor
G. E. Brock.
By Wm C. R. W. Intire
Attorney

UNITED STATES PATENT OFFICE.

GIOTA E. BROCK, OF BLUE MOUND, KANSAS.

VEHICLE-WHEEL.

1,002,636.  Specification of Letters Patent.  Patented Sept. 5, 1911.

Application filed November 7, 1910. Serial No. 591,127.

*To all whom it may concern:*

Be it known that I, GIOTA E. BROCK, a citizen of the United States, residing at Blue Mound, in the county of Linn and State of Kansas, have invented certain new and useful Improvements in Vehicle-Wheels; and I do hereby declare the following to be a full, clear, and exact description of the invention, such as will enable others skilled in the art to which it appertains to make and use the same.

This invention relates to certain new and useful improvements in vehicle wheels, and especially to automobile wheels of the resilient spoke type.

The object of the invention is to construct the spokes in such a manner as to utilize compressed air, and springs coöperatively for securing a cushioning effect.

A further object is to provide means for connecting the tire clamping rim to the rim of the wheel.

With the above and other objects in view, as will appear as the nature of the invention is better understood, the same consists of the novel features of construction and the combination and arrangement of parts hereinafter fully described and claimed.

In the accompanying drawings forming a part of this specification, and in which like characters of reference indicate corresponding parts: Figure 1 is a partial elevation of a wheel embodying my invention, certain parts being broken away. Fig. 2 is a sectional view taken on line 2—2 of Fig. 1. Fig. 3 is a perspective view of a connecting rod and plunger, and Fig. 4 is a sectional view of the air inlet valve.

In the drawings 1 represents the hub of a wheel, carrying spokes 2 radially projecting therefrom, and having their outer ends rigidly secured to an annular rim 3. The spokes 2 are provided with hollow spaces, in which are fitted metallic tubes 4 for receiving connecting rods 5, carrying at their inner ends plungers 6, adapted to slide on the inner surfaces of the tubes and compress the air in a space 7 at their inner ends.

In the hub of the wheel and leading to the spaces 7 are air inlet passages 8, provided with valves 9, which admit air when the pressure is released, but close to prevent its escape when the connecting rods are supporting a load.

In order to lubricate the inside of the tubes 4, so that the plungers will operate freely therein, oil holes 10 are provided in the spokes of the wheel.

The connecting rods 5 project through apertures 11 in the annular rim 3, and have near their outer threaded ends 12, square nut portions 13, to which may be applied a wrench for securing the connecting rods to a tire clamping rim 14, having inwardly extending annular flanges 15, which slidably engage the sides of the annular rim 3. Interposed between the annular rim 3 and the tire clamping rim 14 on the connecting rods are coiled springs 16, which coöperate with the compressed air in the space 7 to absorb shocks incident to a vehicle passing over rough roads.

It is to be understood various changes in the form, proportion and minor details of construction may be resorted to without departing from or sacrificing any of the advantages of this invention.

Having fully described my invention, what I claim as new and desire to secure by Letters Patent is:

A resilient vehicle wheel such as described, consisting of a hub, hollow spokes radially extending therefrom, tubes fixed within said hollow spokes, an annular rim secured to the ends of the spokes, rods carrying plungers within said tubes, a tire-clamping rim on the ends of the rods, said tire-clamping rim slidably engaging the annular rim, coil springs interposed between the two rims and surrounding the rods, the hub being provided with air passages leading from the hollow spokes to the outer periphery of the hub, and check valves inserted in the outer ends of the air passages, the same being so located as to permit of their easy removal and inspection.

In testimony whereof I affix my signature in presence of two witnesses.

GIOTA E. BROCK.

Witnesses:
 LILLIE B. MITCHELL,
 MILTON F. MITCHELL.

Copies of this patent may be obtained for five cents each, by addressing the "Commissioner of Patents, Washington, D. C."